United States Patent [19]

Davis

[11] Patent Number: 4,851,826
[45] Date of Patent: Jul. 25, 1989

[54] COMPUTER VIDEO DEMULTIPLEXER

[75] Inventor: Hedley C. Davis, Middletown, Del.

[73] Assignee: Commodore Business Machines, Inc., West Chester, Pa.

[21] Appl. No.: 55,608

[22] Filed: May 29, 1987

[51] Int. Cl.[4] .............................................. G09G 1/16
[52] U.S. Cl. .................................. 340/731; 340/723; 340/745; 340/802
[58] Field of Search ............... 340/723, 728, 731, 732, 340/745, 798, 799, 802

[56] References Cited

U.S. PATENT DOCUMENTS

| 4,250,502 | 2/1981 | Klauck et al. | 340/745 |
|---|---|---|---|
| 4,533,909 | 8/1985 | Sander | 340/802 |
| 4,575,717 | 3/1986 | Fedele | 340/799 |
| 4,635,105 | 1/1987 | Favreau | 340/750 |

FOREIGN PATENT DOCUMENTS 0092973 11/1983 European Pat. Off. ............ 340/732

Primary Examiner—Gerald L. Brigance
Attorney, Agent, or Firm—Finnegan, Henderson, Farabow, Garrett & Dunner

[57] ABSTRACT

A computer video demultiplexer for combining a plurality of low resolution, video input signals into a plurality of higher horizontal and vertical resolution video output signals. Control signals for the video demultiplexer are coded on non-displayed video scan lines which are uniquely addressable so that several demultiplexers operated from one video signal may control a number of high resolution peripheral devices.

8 Claims, 11 Drawing Sheets

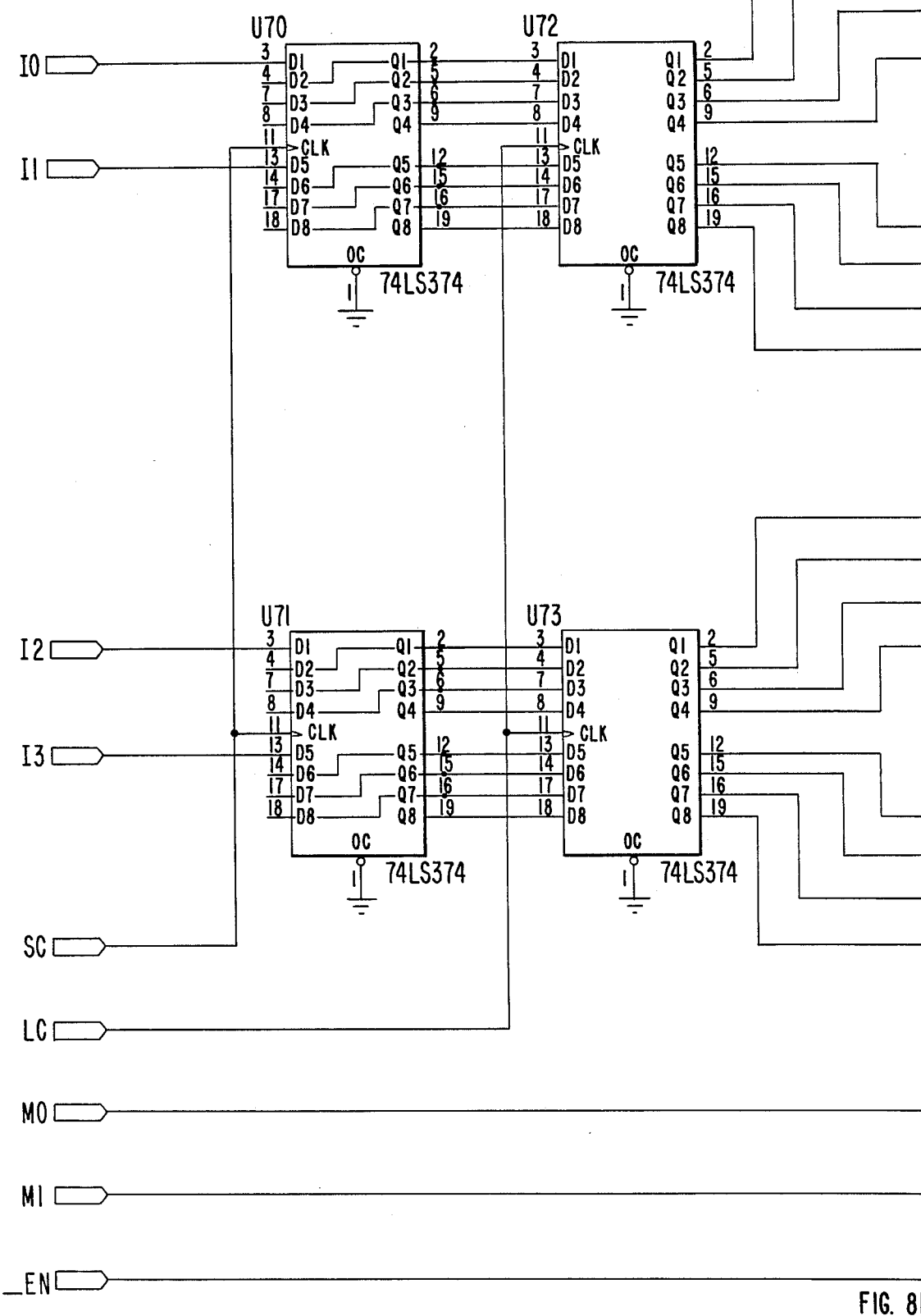

COMPUTER VIDEO DEMULTIPLEXER

BACKGROUND OF THE INVENTION

1. Field of the Invention

The present invention relates to a system for generating high resolution computer video display or peripheral device driver signals using computer system video output channels designed for producing lower resolution video signals.

2. Background Information

Computers providing a visual image output using cathode ray tubes (CRT's) normally maintain a data representation of the image in the computer's random access memory (RAM), and periodically transmit these data to the CRT in order to produce the display image. This type of system requires constant refreshing, or rewriting, in order to maintain visible display. Refreshing the display may be accomplished using either dedicated hardware or a combination of hardware and software. The central processing unit (CPU) needs to read and write to the display RAM, therefore there is a contention between the CPU and the circuitry controlling the display. As the resolution, or number of pixels comprising the displayed image increases, additional memory is required for the image, and more and more memory bandwidth must be consumed to maintain the display. There is a limit to the amount of image resolution where eventually the entire memory bandwidth is being used to refresh the display, and no memory bandwidth is available to modify the display. This is a traditional bottleneck in low cost computer architectures.

One attempt to avoid this limitation has been to locate display RAM in a dedicated frame buffer used for display refresh purposes, and to allow the CPU only limited access to that buffer. This often takes place via a dedicated serial, parallel, or direct memory access (DMA) channel. More expensive systems provide a frame buffer with a dedicated CPU responsible for performing operations only on display RAM. Typically in such systems, the dedicated CPU receives commands from the host CPU regarding tasks to be performed.

A second method for increasing resolution without increasing the memory bandwidth requirements for refreshing a display has been to incorporate interlaced displays. This can be done with conventional video monitors or National Television System Committee (NTSC) signals for viewing with conventional home televisions. This typically involves using two frames of video information to refresh the display. One of the frames is the normal display field and the second frame is similar to the first, but offset vertically by one-half a horizontal line. In this way the screen is scanned at 60 Hz. in the normal fashion, but total screen updating occurs at 30 Hz. This often results in objectionable flicker and is annoying to the user. One solution to the flicker problem has been to employ frame buffer techniques to build a scan converter which stores the even and odd visual frames in RAM, and uses that memory to drive a display at a higher bandwidth, achieving a (nominally) 60 Hz. refresh of the entire display. In this type of design, the interlaced output from the host is different for even and odd frames, and therefore can be considered to have encoded information indicating which type of display field is being updated, either even or odd. Scan converters arguably increase the vertical resolution of the display, but do not increase the horizontal, temporal, or color resolution.

Frame buffer and scan converter techniques restrict the use of a computer video output terminal to a single device and they also rarely exploit regions of the computer output video signals that contain no useful data, such as during the horizontal and vertical blanking intervals. It is possible to encode data in these regions for other purposes and also to encode data in the video output signal by modifying sync signals.

It is an object of the present invention to provide a system and method for generating high horizontal and vertical resolution video frame data using conventional computer device video output channels designed for driving lower resolution, non-frame buffered displays.

It is another object of the present invention to provide a system and method for decoding information encoded in a single host computer video output signal and distinguishing that information from conventional video data normally output by such a computer, allowing control of a plurality of devices using such encoded data.

Yet another object is to provide a system and method and for using a conventional frame buffer to derive a display of arbitrary spatial, color, or temporal resolution. Data in this frame buffer are updated by addressing individual regions of the frame buffer via the control information encoded in the computer output video signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a system is provided for generating high horizontal and vertical resolution video display frames from low horizontal and vertical resolution computer video output frames, comprising means for storing a plurality of low horizontal and vertical resolution computer video output frames; and means for generating a plurality of high horizontal and vertical resolution video output frames by combining a plurality of the low resolution frames.

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

In accordance with the present invention, a system for generating high resolution video display frames from low resolution computer video output frames comprises means for storing a plurality of low horizontal and vertical resolution computer video output frames. In a preferred embodiment a Commodore Amiga microcomputer provides vertical sync (VSYNC), horizontal sync (HSYNC), red, green, blue, and intensity (R, G, B, I) signals. These video output data are arranged in frames of 512 pixels by 200 lines, where each frame is sufficient to create one low resolution video image. In the context of incoming video, there are both high and low resolution pixels available. High resolution pixels are 10 nanoseconds long. Low resolution pixels are 110 nanoseconds long. Output high resolution pixels are 14 nanoseconds long.

Further in accordance with the present invention the system includes a means for generating a plurality of high horizontal and vertical resolution video output frames by combining a plurality of the lower resolution video output frames from the computer.

Figure 1:
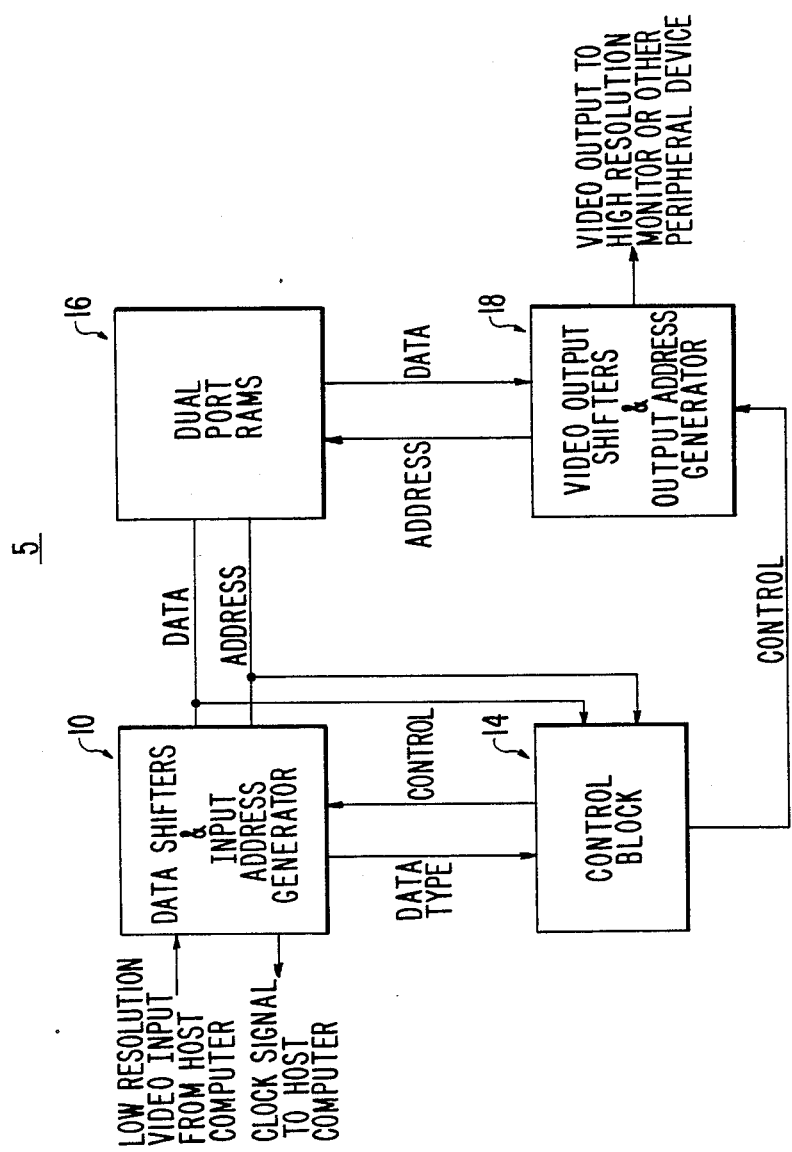
FIG. 1 is a block diagram of a video demultiplexer incorporating the teachings of the present invention.

In a preferred embodiment, as shown in FIG. 1, the means for storing consists of data shifters and input address generator 10 which temporarily holds low horizontal and vertical resolution video output frame data from a host computer and which signals the control block 14 as to whether the data are control data or pixel data. Control block 14 then sets the mode of video demultiplexer device 5 in any one of several modes to be discussed hereinbelow, including a low resolution scan conversion mode and a high resolution expansion mode. Based on control block 14 mode information, input address generator 10 assigns addresses to the incoming data for storage in the dual port RAMs 16. The means for generating video output video output shifters and output address generator 18 coupled to both the dual port RAMs and control block 14 specify the order in which video data are to be read from the dual port RAMs such that several low resolution video input frames may be coupled together to provide one high resolution output frame to a device such as a high resolution video monitor. As will be discussed in greater detail hereinafter, in the preferred embodiment, horizontal resolution is increased by combining two low resolution video scan lines, nominally 512 pixels long, into one high resolution scan line, nominally 1024 pixels long. Vertical resolution is increased from the nominally 200 scan lines of a low resolution video frame to 800 high resolution lines by using pixel data on the RED data line from the computer as one scan line, and pixel data from the GREEN data line as a second scan line. Thus, every 200 low resolution scan lines contain 400 scan lines of video output data. Two full low resolution video frames are combined vertically to produce 800 vertical lines. The preferred embodiment nominally requires 4 low resolution video input frames to generate one high resolution frame in the expansion mode. The high resolution video output frame consist of two of the lower resolution video input frames located side by side and above two more of the lower resolution video input frames located side by side.

The detailed operation of the preferred embodiment of video demultiplexer 5 in combining several low resolution computer video output frames into a single high resolution computer video output frame for use by high resolution video display is described in detail below. It should be understood that the embodiment shown in FIG. 1 is the one which is presently preferred and is by no means limiting on the invention. Control signals are coded onto video data output by the host computer. but control signals could also be encoded into the phase relationship and lengths of the horizontal and vertical sync signals while still conforming to the inventive concept of the present invention. The system of the present invention may also be configured to perform transformations on the computer video output data, allowing the system to interpret the video data either as plain view data or as some higher level information requiring interpretation by a receiving device such as a laser printer or audio output device.

Figure 2:
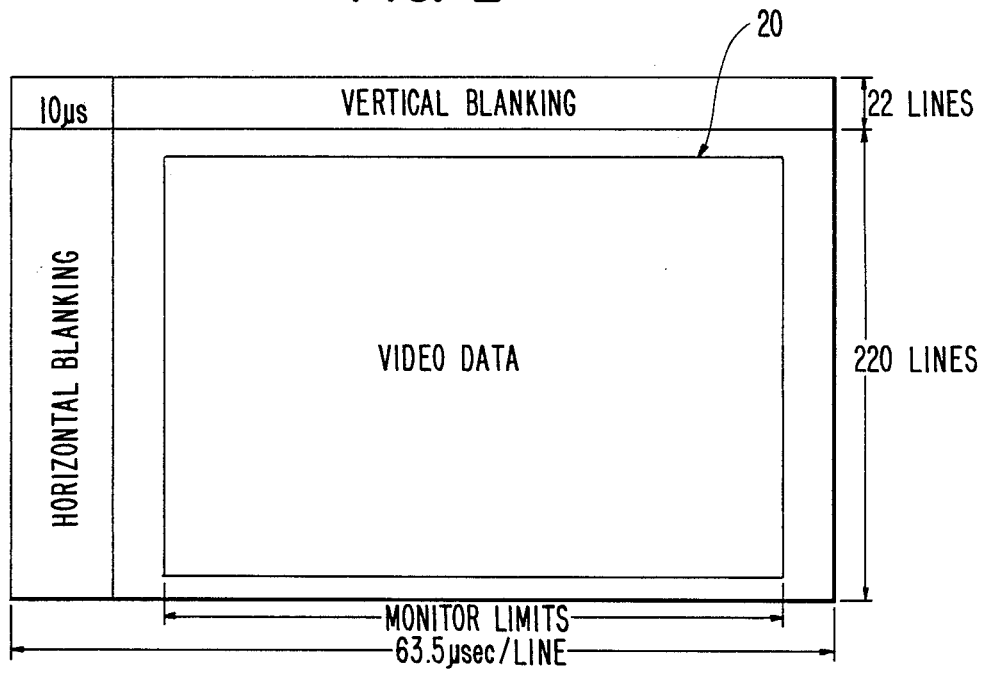
FIG. 2 is a timing diagram showing the blanking and video data intervals used in an NTSC video signal.
Figure 3:
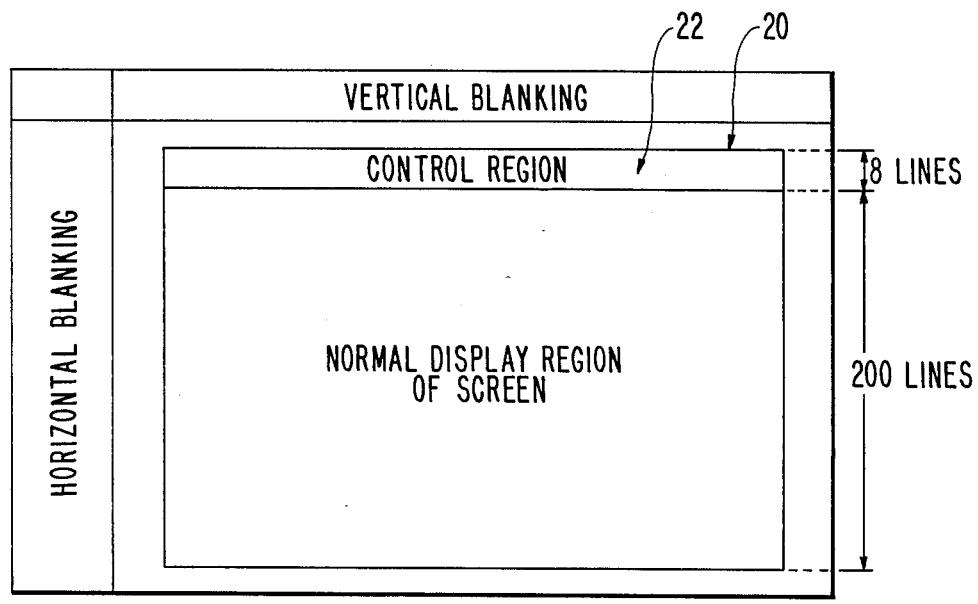
FIG. 3 is a timing diagram showing the blanking intervals, data region, and control regions used as input by the present invention.

FIG. 2 is a video frame timing diagram loosely conforming to the NTSC video standard. Each frame consist of about 262.5 scan lines, each scan line lasting for about 63.5 microseconds. The first 10 microseconds of each scan line consist of horizontal blanking time. Video output data are encoded in the remaining 44.7 microseconds of each scan line as shown in region 20. The first 22 scan lines are devoted to vertical blanking and the remaining 240 scan lines are available for video data. FIG. 3 shows that in the preferred embodiment, the first 8 scan lines in control region 22 of the video data region 20 are devoted to sending control information from the host computer to the system of the present invention. These 8 dedicated scan lines are called control lines.

Figure 4:
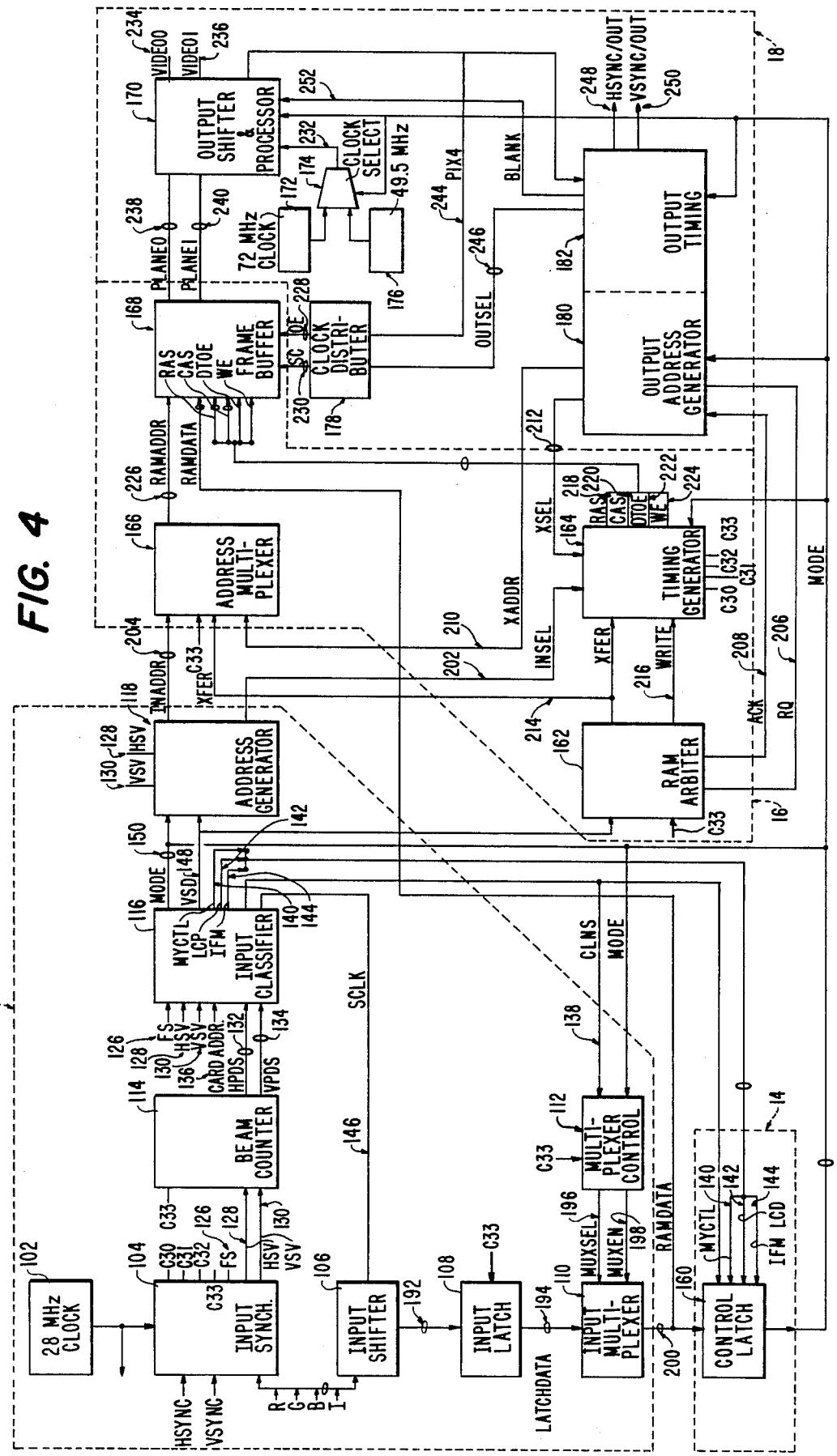
FIG. 4 is a detailed block diagram of the video demultiplexer shown in FIG. 1.

Looking to FIG. 4, data shifter and input address generator 10 of FIG. 1 contains 28 MHz clock 102, input synchronization circuit 104, input shifter 106, input latch 108, input multiplexer 110, multiplex controller 112, beam counter 114, input classifier 116, and address generator 118.

The 28 MHz clock 102 synchronizes data shifters and input address generator 10 of FIG. 1 with the host computer, which in the preferred embodiment has an external synchronization port. The system of the present invention may also be used with computers that do not have external synchronization ports by incorporating a circuit to extract synchronization information from the HSYNC and VSYNC and video data signals coming from the host computer.

Input synchronization circuit 104 is coupled to the host computer video output HSYNC, VSYNC, and R, G, B, I signals, and is also coupled to 28 MHz clock 102. Input synchronization circuit 104 provides four phase 3.5 MHz clock signals C30–C33 to the rest of the input section. These signals are phase synchronized with HSYNC, and with the computer pixel data. This clock is free running until HSYNC is asserted. At this time the logic runs 1 full cycle with HSV asserted on line 128, and then waits until HSYNC is deasserted. At this point the four phase clock resumes counting and is therefore synchronized with HSYNC to within one pixel. Input synchronization circuit also creates a 14 MHz fast shifter clock, FS on line 126 which is constantly verified against the incoming video data to ensure that shift registers running from this clock always shift valid data.

Figure 5A:
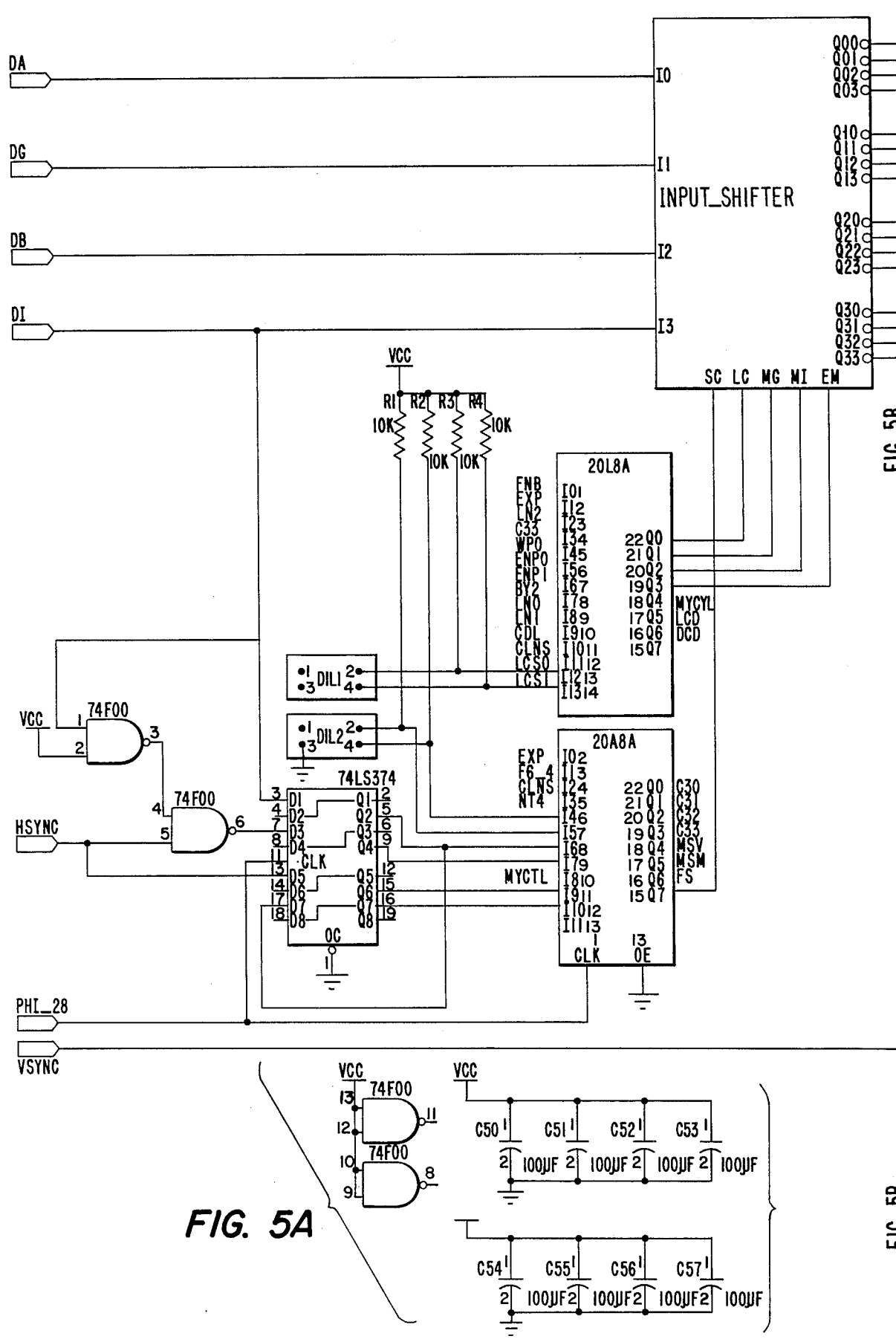
FIG. 5 is the left half of an electrical schematic diagram showing the individual integrated circuits of the present invention and should be combined with FIG. 6 to form one complete diagram. Schematic diagrams 5-10 conform to the Mentor Graphics IDEA system, for use on Apollo computers.
Figure 5B:
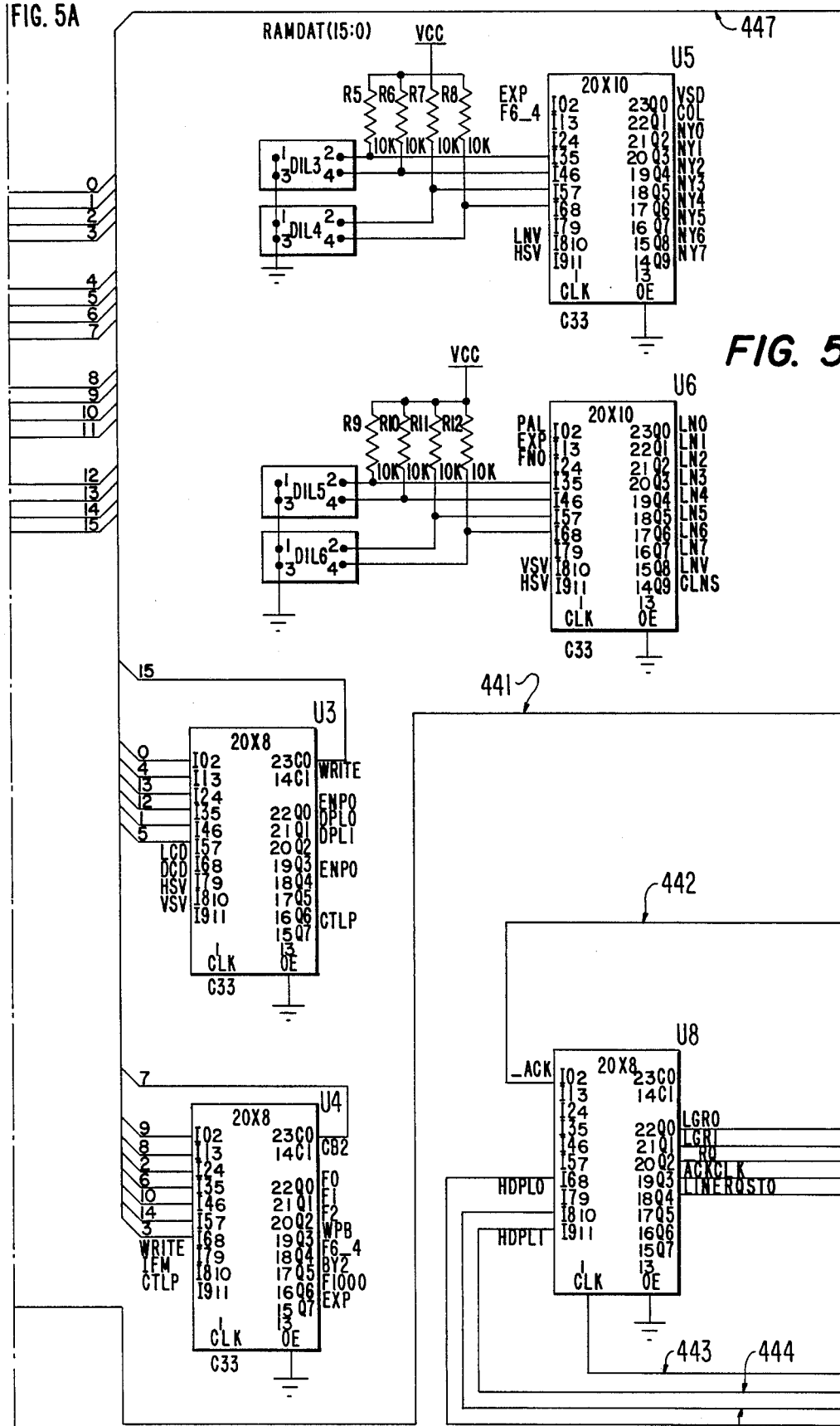
Figure 6A:
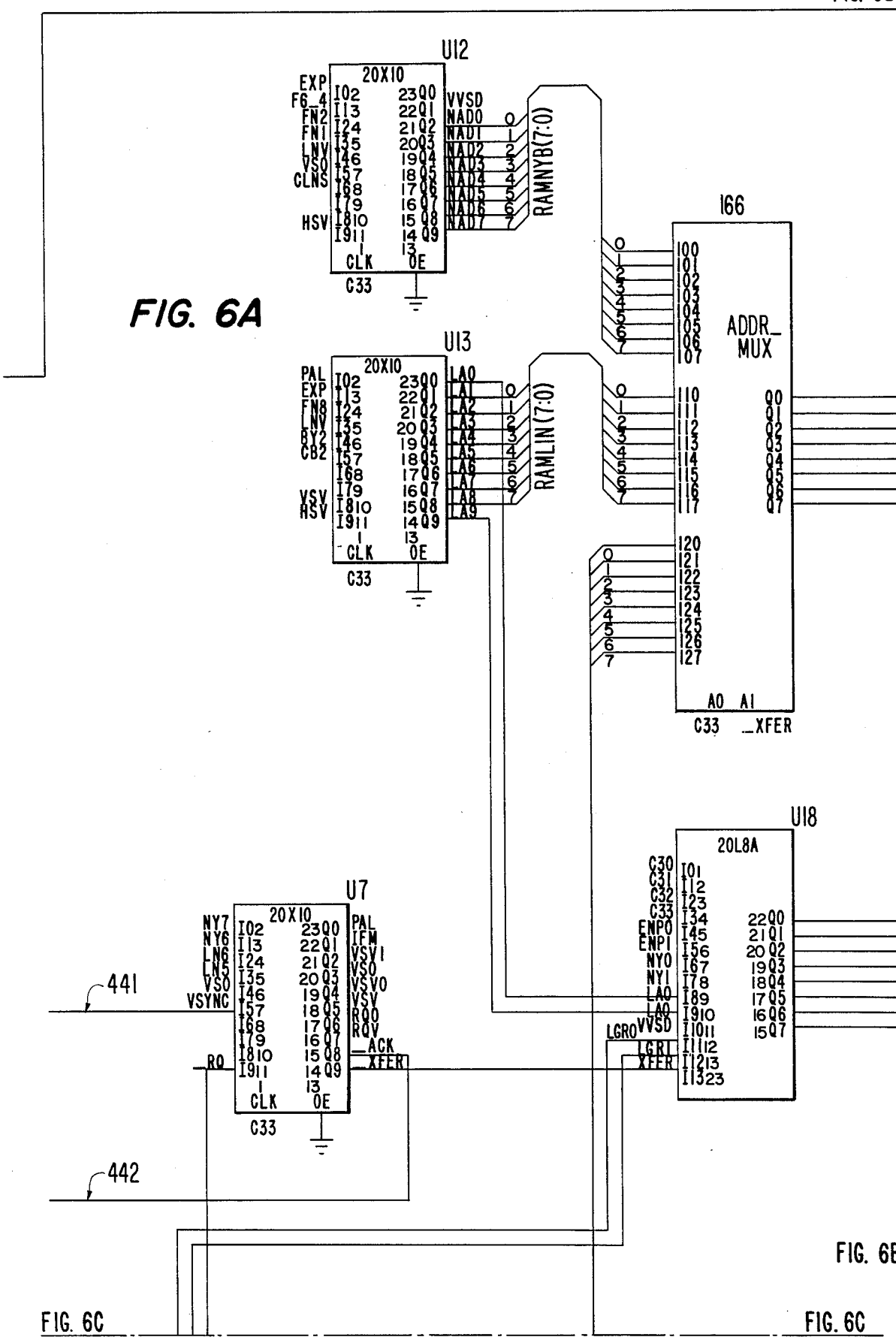
FIG. 6 is the right half of an electrical schematic diagram showing the individual integrated circuits of the present invention and should be combined with FIG. 5.
Figure 6B:
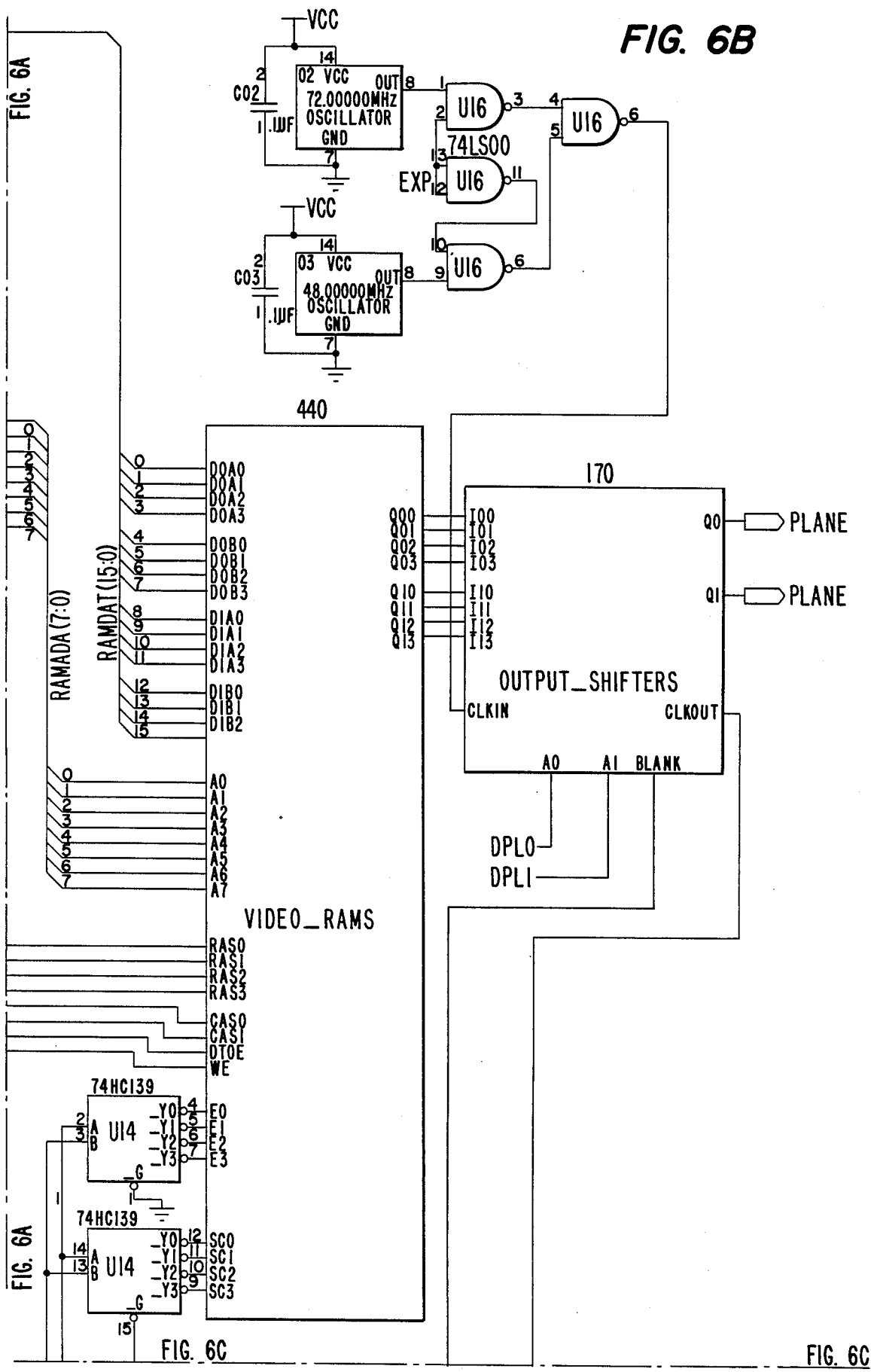
Figure 6C:
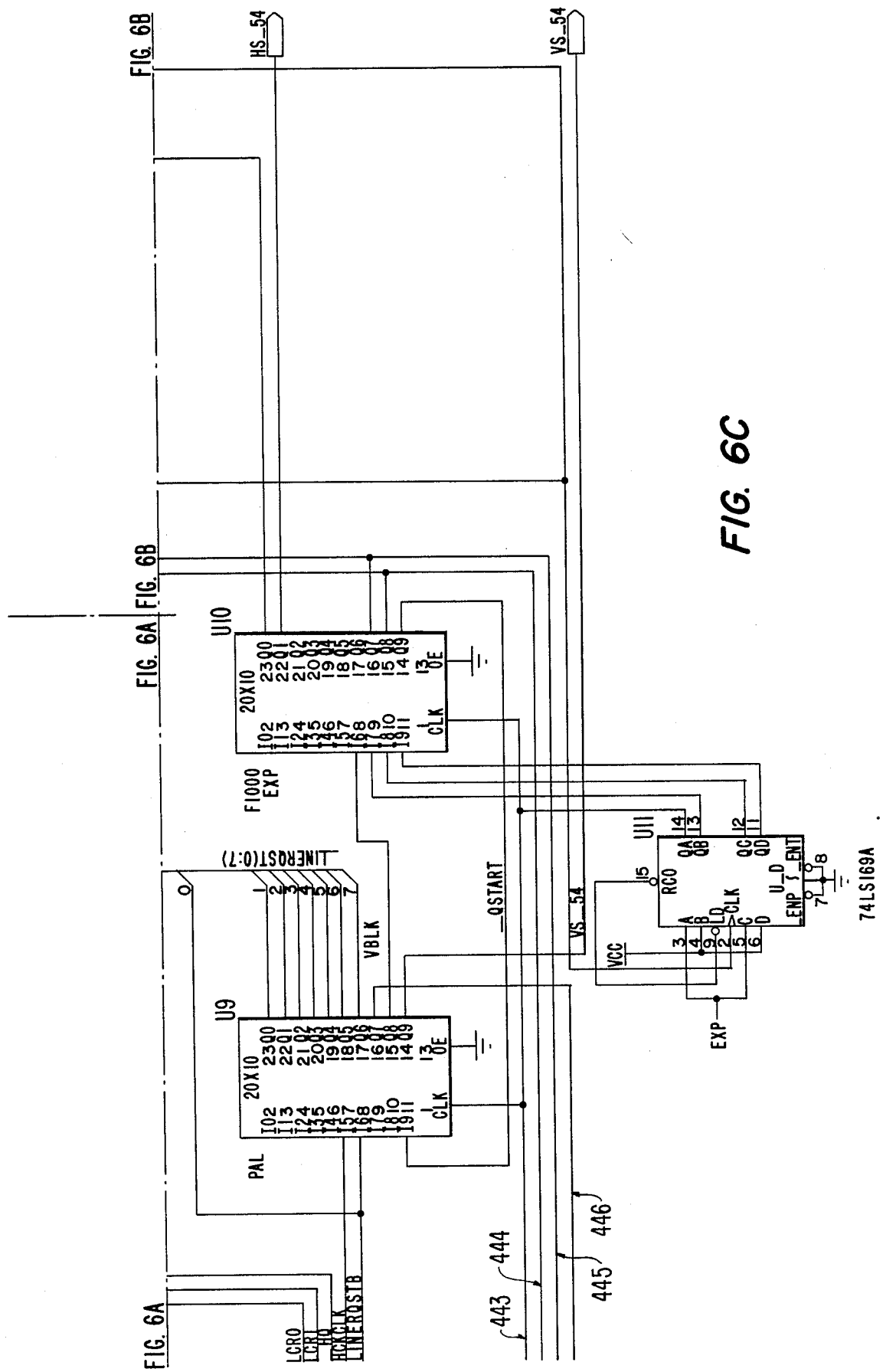

The functions of input synchronization circuit 104 are performed by integrated circuits U1, U2 and U15 of FIG. 5 and part of U7 of FIG. 6. Circuit U1 is a standard part number 74F374 eight bit latch (edge triggered). Circuit U2 is a Monolithic Memories 20R8A programmable logic array (PAL) configured according to the CUPL source code presented in Appendix A. CUPL is a compiler for programmable logic sold by Assisted Technologies Inc. and is described generally on pages 11-29 to 11-37 of the PAL/PLE Device Programmable Logic Array Handbook, 5th Edition, available for Monolithic Memories Inc. Integrated circuit U7 is a Monolithic Memories 20X10 PAL circuit configured according to the CUPL source code presented in Appendix F and circuit U15 is a quad 2 input NAND gate, standard part number 74F00.

Beam counter 114 receives a vertical sync valid signal, VSV, on line 130, a horizontal sync valid signal, HSV, on line 128, and an input video nybble clock on C33. Circuit 114 consists of a horizontal and a vertical counter which counts synchronously with the input video data on every frame. The horizontal counter represents the current nybble of pixels coming from the host computer. The vertical counter represents the current line of video being received. Circuit 114 outputs consist of a horizontal beam position, HPOS on bus 132 consisting of 8 bits, and the current video input line, VPOS on bus 134 consisting of 9 data bits.

Beam counter 114 consist of integrated circuits U5 and U6 of FIG. 5. Circuit U5 is a Monolithic Memories 20X10 PAL configured according to the CUPL source code of Appendix D. Circuit U6 is a Monolithic Memories 20X10 PAL configured according to the CUPL source code of Appendix E.

Input classifier 116 receives fast shifter clock signal FS on line 126, horizontal sync valid signal HSV on line 128, vertical sync valid signal VSV on line 130, and a 2 bit card address signal on bus 136. The card address on bus 136 indicates the position of a switch that determines on which of the eight control lines of FIG. 3 the system will receive its encoded control data. In the preferred embodiment, this permits up to 8 video demultiplexers to be connected to 1 computer video output port and control up to 8 separate devices independently. Other control signals coding schemes not exploited by the preferred embodiment would permit additional video demultiplexers to be connected to a single computer video output port. Input classifier 116 produces several output signals based on the position of the input beam. These signals consist of control line region signal CLNS on line 138 which is asserted during the entirety of the time the video beam is in the control line region, based on the 9 bit VPOS signals of bus 134. "My control line signal" MYCTL on line 140 is asserted during the entirety of one of the control lines that pertains to this device. The pertinent control line is defined by the signal on 3 bit card address bus 136 which is manual switch settable. The shift clock signal for the input shifters, SCLK on line 146 is the clock to the input shifters during MYCTL, and is driven very slowly, clocking every once every 128 pixels, so that when LCD, discussed, hereinbelow, is asserted, the input shifters 106 contain data from 16 bits of video data from the control lines, defined as control bits. When video display data as opposed to control data are being received, SCLK runs at 14 or 7 MHz depending on the current mode of the video demultiplexer. Reception of normal video data rather than control data is signalled when CLNS is not asserted. Latch control data signal LCD, on line 142 is a signal which is asserted once per video input frame when the control information for this card is in the shift registers 106, and is based on the status of MYCTL and HPOS. Valid shifter data signal VSD on line 148 is a signal asserted to tell the arbiter circuit 162 (discussed hereinafter) that the input shift registers 106 are currently full of data which should be written to frame buffer 168. Interlace frame detect signal IFM on line 144 is toggled by input classifier 116 once per frame. Interlaced mode displays have a different phase relationships between VSYNC transitions and HPOS than do normal frames. If an interlace frame is detected by circuit 116, this signal is forced to a 1, otherwise, this signal toggles once per frame. Phase alternation line system input, when detected by circuit 116, is indicated on one line of mode bus 150. Phase alternation line mode input is essentially identical to NTSC input except that phase alternation line mode input has more video lines. The phase alternation line signal on mode bus 150 indicates whether the video is phase alternation line or NTSC.

Figure 7A:
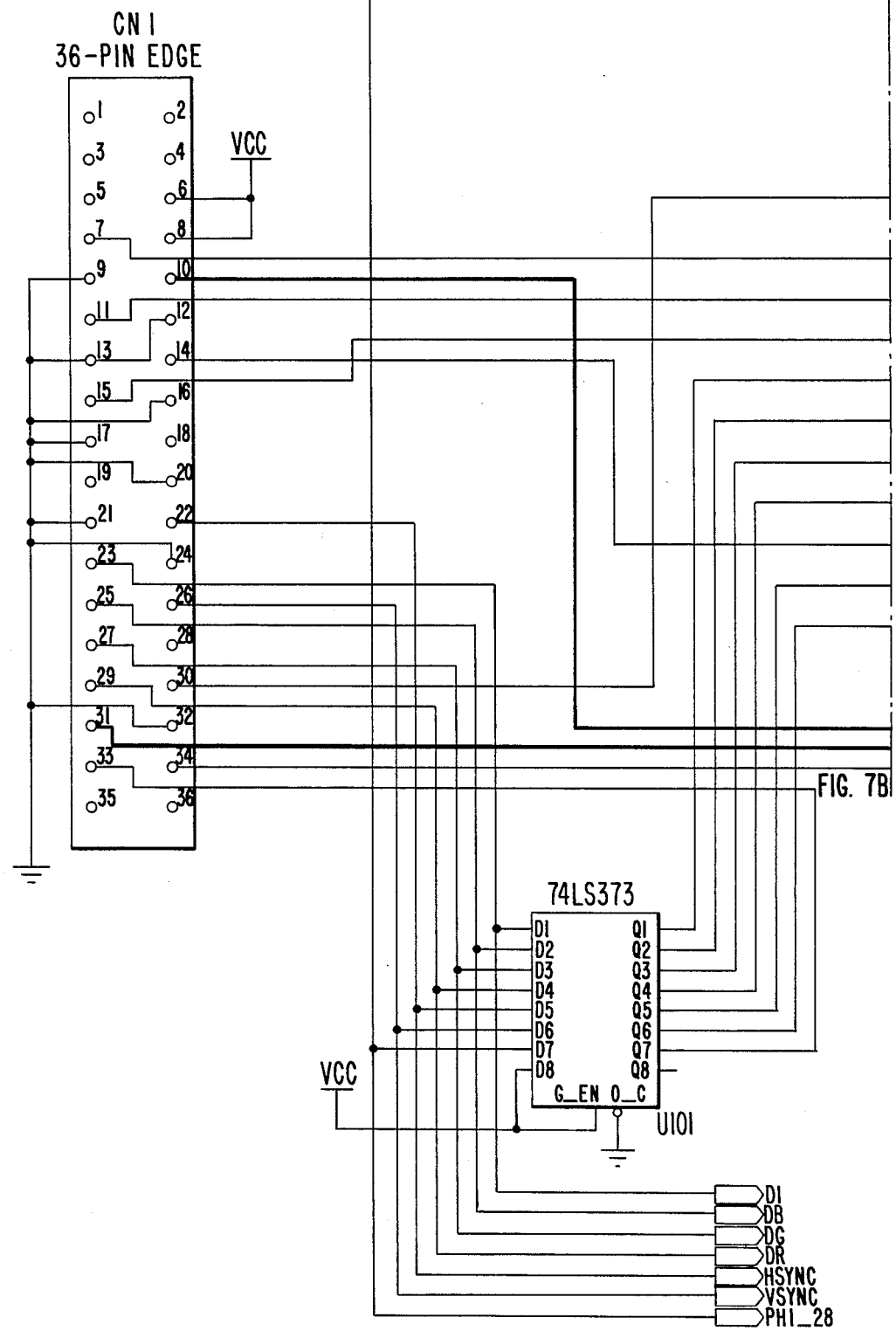
FIG. 7 shows the input/output connections of the circuit of the present invention.
Figures 7A, 7B:
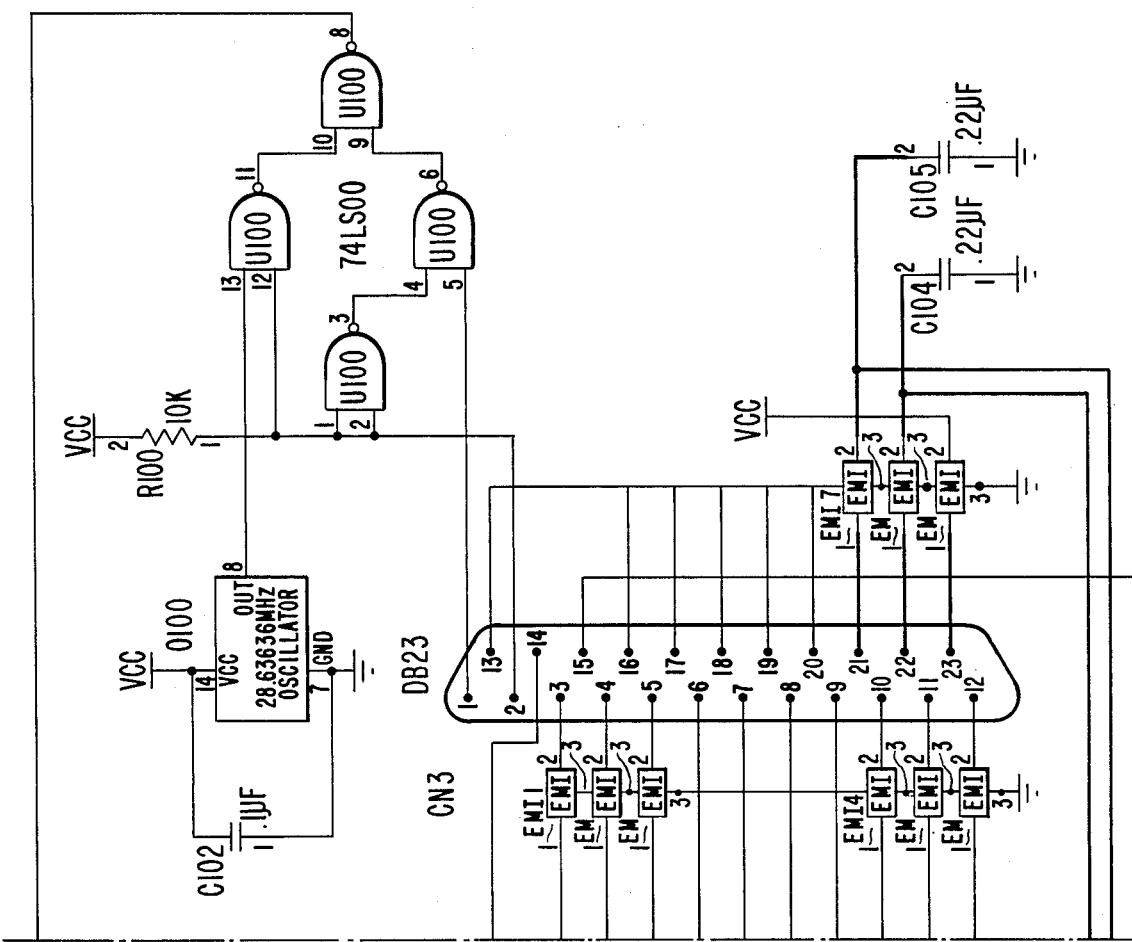

Input classifier 116 consists of portions of circuits U5, U6, and U7 of FIG. 7, all described hereinabove.

Input shifters 106 receive R, G, B, I input from the host computer video output port, and SCLK on line 146 from input classifier 116 and provide 16 bits of output data on bus 192. Input shifter 106 consists of 4 serial input parallel outshift registers of 4 bits each with R, G, B, and I forming the input to the respective shift registers. All shift registers are clocked by SCLK on line 146. SCLK is typically run at the expected pixel rate thus causing the shifter to shift in data once per pixel time. When a control line is being received rather than a video data line, SCLK may be run slower allowing the shifters to construct the full mode input to the control latch 160 so that the data may be examined for validity before actually being latched into control latch 160, as discussed hereinbelow.

Figure 8B:
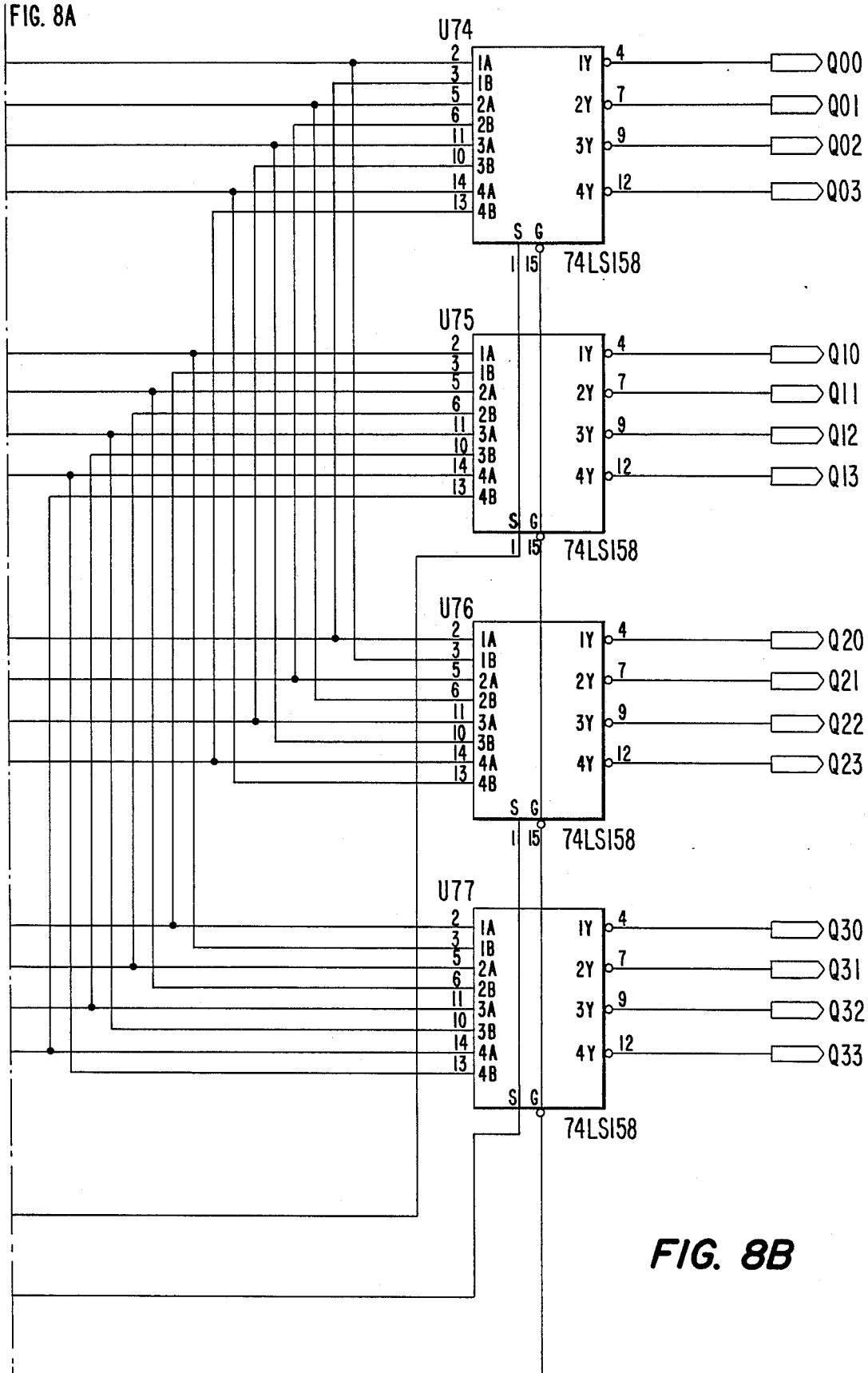
FIG. 8 is an electrical schematic diagram showing the individual integrated circuits of input shifters 106 of FIG. 6.

Input shifter 106 consists of integrated circuits U70 and U71 of FIG. 8. U70 and U71 are 8 bit latches (edge triggered), standard part number 74F374.

Input latch 108 receives 16 bit SHIFTDATA output on bus 192 from input shifter 106 and a latch clock signal LATCHCLK on line C33 which serves to latch the shift register output and hold it until another LATCHCLK signal occurs on line C33. Signal C33 occurs once per 3.58 MHz cycle therefore data coming from input latch 108 are valid over the entire cycle. Input latch 108 provides 16 bits of LATCHDATA output on bus 194.

Input latch 108 consist of integrated circuits U72 and U73 of FIG. 8. Circuits U72 and U73 are 8 bit latches (edge triggered) standard part number 7F4374.

One control line of video output from the host computer consists of 4 regions of data, one for each of the R, G, B, and I lines, which consist of 4 bits each. Each of the 4 bits consists of 128 high resolution pixels, all of the same color. The regions are left justified on the screen. The current color being displayed by the system in each of these regions is specified by the host computer system software, and is latched and interpreted as control information. The bits and their location on each of the video input data lines are shown below.

TABLE 1

| | PIXEL POSITION (HIGH RESOLUTION) | | | |
|---|---|---|---|---|
| Color | 000–127 | 128–255 | 256–383 | 384–511 |
| Red | F6-4 | FN0 | ENP0 | DPL0 |
| Green | INTERLACE | FN1 | ENP1 | DPL1 |
| Blue | 0 | FN2 | WPB | LESS16 |
| INTEN | 1 | EXPAND | 0 | 1 |

Display control bits DPL0 and DPL1 are the display enable bits for the 2 separate high resolution video frame planes capable of being displayed by the present embodiment. Dual port RAMs 16 of FIG. 1 are capable of storing several low resolution video frames from the host computer which may be displayed by video output shifters and address generator 18 as either one of two high resolution video output frame planes. The two combinations of DPL0 and DPL1 and their resulting display modes are shown in the table below.

TABLE 2

| DPL0 | DPL1 | |
|---|---|---|
| 0 | 0 | Blank screen |
| 0 | 1 | Display plane 0 in full intensity |
| 1 | 0 | Display plane 1 in full intensity |
| 1 | 1 | Display plane 1 and plane 0 in four level display. Plane 1 is most significant plane. |

In the preferred embodiment, two full high resolution video output frames (planes 0 and 1) may be stored in frame buffer 168. Memory could be provided to store additional planes in embodiments employing this inventive concept. The LESS16 of Table 1 above is the 1008 pixel flag. Setting this flag causes the video demultiplexer system to display only 1008 pixels in the expansion mode rather than 1024 pixels, and 692 pixels in the scan conversion mode. The 1008 pixel per scan line mode is necessary for compatibility with the host computer of the present embodiment. Bits ENP1 and ENP0 of Table 1 control which planes are to be written to with control data. If both are zero, then no display writing occurs during this frame. If only one is set, then the display writes occur to one plane only. If both are set, then display writing will occur to both planes. When set, the EXPAND bit of Table 1 puts the video demultiplexer into the expansion mode, and when clear the video demultiplexer goes into the scan conversion mode. The INTERLACE bit of Table 1, when set, allows the display to be updated in an interlaced fashion as opposed to a block approach where the top half is updated on one frame, and the bottom half is updated on the second frame. Bits FN0, FN1 and FN2 indicate the frame number currently being written by the host computer and control the address within frame buffer 168 on FIG. 4 where the current input frame data are to be written. FN0 is the field number which corresponds to the vertical position of the field, FN1 and FN2 correspond to the horizontal display position of the field. In the expansion mode, if bit F6-4 is 0, the video demultiplexer expects 512 high resolution pixels per scan line, based on frame number. If bit F6-4 is set, then the video demultiplexer expects 338 low resolution pixels per scan line. In the scan conversion mode, if the INTERLACE bit of Table 1 is set and bit F6-4 is also set, then the video demultiplexer will ignore the value written to FN0, and will use a toggled value of FN0. This permits the video demultiplexer to correctly resolve interlaced video output signals. The WPB (write per bit) mode bit is normally 0. If set, it enables the write per bit capability of the card. In the write per bit mode, the RG bits carry data and the BI bits carry the write mask to be used by the DRAMS in frame buffer 168. This mask is true when low. A 0 on the BI bit allows the RG data to be written, and a 1 on the BI bit disables writing. Bits in Table 1 indicated by -0- and -1- must be presented with the values shown in order to tell the video demultiplexer that control information is present on the control line and to allow for future expansion.

Multiplexer control circuit 112 controls the operation of input multiplexer 110 and receives as input a write per bit mode enable signal on mode bus 150 from input classifier 116; and CLNS signal one line 138; and a latch clock signal on line C33. Circuit 112 generates signals MUXSEL on line 196 and MUXEN on line 198. During a CLNS signal on line 138 the multiplex enable signal MUXEN is asserted on line 198 and forces the state of the multiplexer 110 so that control latch 160 will receive input data on 16 bit bus 200. When write per bit is enabled on line 150, MUXEN on line 198 causes input multiplexer 110 to output video data or mask data to frame buffer 168. During normal data writing when WPB is not asserted on line 150, the MUXEN line 198 is disabled during the write mask portion of the frame buffer cycle. This causes the write mask presented to the frame buffer to be all ones, i.e. to enable writes to all bits. Note that it is not necessary to always use write per bit cycles with the frame buffer, but this easier than generating the 2 types of write cycle timing for the frame buffer based on WPB.

Multiplexer control circuit 112 consists of integrated circuit U17 of FIG. 5. Circuit U17 is a Monolithic Memories 20L8A PAL configured according to the CUPL source code of Appendix L.

Input multiplexer 110 receives LATCHDATA on 16 bit bus 194, MUXSEL signals on line 196, and MUXEN signals on line 198. Circuit 110 outputs the latched R, G, B, I data from input latch 108 to 16 bit RAMDATA bus 200. The write per bit mode requires that data being fed to the frame buffer have one value, the write mask, during one part of the memory cycle and another value, the actual video data, at another time. This is achieved by the input multiplexer 110 as controlled by the MUXSEL line 196 and MUXEN line 198.

Input multiplexer 110 consists of integrated circuits U74–U77 of FIG. 8. circuits U74–U77 are quad 2 input multiplexers with enable, standard part number 74F158.

Control block 14 of FIG. 1 consists of control latch 160 of FIG. 4 which receives RAMDATA on 16 bit bus 200; a MYCTL signal on line 140 indicating that the control data being received is control data for this multiplexer as switched by 3 bit card address bus 136; a CLNS signal on line 138 indicating that control line signal is being received; an LCD or latch control data signal on line 142; and an IFM interlace frame detected signal on line 144. Control latch 160 outputs mode signals to the remainder of the system on mode bus 150 and consists of a latch which contains the current operating mode of the video demultiplexer. When CLNS on line 138 is valid, latch 160 examines the input data on line 200 to verify that it is control data rather than background color data. Background color data consist of unchanging values. From Table 1, if bits in the intensity line vary from 1 to 0 and back again, this signals to control latch 16 that control data are being received rather than background color data. When MYCNTRL is valid on line 140, LCD is asserted once per frame when control information is in input shift registers 106, and latch 160 latches the data if it looks valid, otherwise latch 160 ignores incoming data and assumes default conditions. When CLNS on line 138 goes invalid, and no control data are detected on any control line during the frame, control latch 160 assumes default values for the low resolution scan conversion mode. If control data were detected, but not for this card, as selected by the card address signal on bus 136, the latch 160 will assume an appropriate mode to continue displaying data the same way and not modify data during the input field. If IFM is asserted, default conditions are modified slightly so that interlace displays are supported during the scan conversion mode. Modes set by control latch 160 include:

(a) EXPAND - Indicates that the system is in the expansion mode in the horizontal dimension. If set, the system nominally displays 1024 pixels horizontally, and requires at least two frames of input data to build any given line. If EXPAND mode is clear, which is the default, the system displays 704 pixels at a different frequency set by clock select circuit 174 to be discussed hereinbelow, so that the line time remains constant and displays on horizontal line. In this case, any given input line is used to generate an entire output line.

(b) INTERLACE - Two passes from the system are required to construct a given vertical line on the display. If this is set, which is the default, than the two passes are performed in an interlaced fashion If this is clear, then one pass writes to the upper half, and another pass writes to the lower half.

(c) LESS16 - This flag simply blanks the last 16 pixels on a line. This is done to solve problems with early host computer hardware in the preferred embodiment that could only deal with 1008 pixels per line but not 1024 pixels per line.

(d) DPL0, DPL1 - These signals determine how the two high resolution planes in frame buffer 168 are to be updated as indicated in Table 2 hereinabove.

(e) ENP0, ENP1 - Enable writes plane 0 and 1 respectively.

(f) WPB - This flag enables the write per bit capability of the video demultiplexer. This employs the write per bit capabilities of the DRAM circuits and allows changing only selected pixels while surrounding pixels remain unchanged. This permits writing to selected portions of the high resolution output screen for applications such as scrolling or animation. The flags WPB, ENP0, ENP1 determine how area selected by F6-4 INTERLACE, and FN2-FN0 are to be written.

TABLE 5

| WPB | ENP1-0 | |
|---|---|---|
| 0 | 00 | Nothing is written |
| 0 | 01 | RG targeted to plane 0 |
| 0 | 10 | RG targeted to plane 1 |
| 0 | 11 | RG targeted to plane 1, BI targeted to plane 0 |
| 1 | 00 | Nothing is written |
| 1 | 01 | Write per bit to plane 0 |
| 1 | 10 | Write per bit to plane 1 |
| 1 | 11 | Write per bit, same data to both planes |

In write per bit mode it is possible to selectively write to individual pixels in the bit map in frame buffer 168. In this case lines R and G carry the data to be written to the target, and B and I carry the write enable mask. If the mask is 0 then no write occurs, if the mask is 1, then data are written. Here again, R and B apply to even lines, and G and I apply to odd lines.

(g) F6-4 - This mode changes the way information is written into the frame buffer 168, and defines whether any given horizontal line in the frame buffer is to be written with three passes of low resolution input pixels, or two passes of high resolution input pixels. If clear, the display is broken down in to four contiguous regions which are updated by scanning 512 pixels per line in high resolution mode. In this case the value is passed in FN2-FN0 of Table 1 and the regions are numbered as follows:

TABLE 3

| | | 0-511 | 512-1023 |
|---|---|---|---|
| Columns (pixels) | | | |
| (Words) | | 0-31 | 32-63 |
| Lines | 000-399 | 000 | 001 |
| | 400-799 | 100 | 101 |

If set, display is broken into six contiguous regions which are updated by over scanning a low resolution display of 352 low resolution input pixels. In this case, the values are passed in FN2-FN0 of Table 1 and the regions are numbered as follows:

TABLE 4

| Columns | | 0-351 | 336-687 | 672-1024 |
|---|---|---|---|---|
| (Words) | | 0-21 | 21-42 | 42-63 |
| Lines | 000-399 | 000 | 001 | 010 |
| | 400-799 | 100 | 101 | 110 |

Each region is 352 pixels wide, by 200 line-pairs tall. Note that there is a one word overlap between adjacent horizontal regions. Thus F6-4 and FN2-FN0 determine the target are of the screen which may be written to. Note that if INTERLACE is set, then FN0 determines which line pairs to update (even or odd). Also note that if INTERLACE is set and EXPAND is zero, then F6-4 can be used to cause the video demultiplexer to automatically pick the appropriate FN0.

(h) F2, F1, F0 - These signals indicate for a given setting of F6-4, and INTERLACE which region of the frame buffer 168 should be written to during this frame.

Control latch 160 consists of integrated circuits U3 and U4 of FIG. 5. Circuits U3 and U4 are standard Monolithic Memories 20X8 PALs. Circuit U3 is configured according to CUPL source code of Appendix B and circuit U4 is configured according to CUPL source code of Appendix C.

Address generator 118 receives a VSV signal on line 128, an HSV signal on 130, and a VSD signal on line 148. Circuit 118, consists of 2 counters which create the address to store incoming video data in frame buffer 168. One counter creates horizontal addresses and the other counter creates vertical addresses. Based on vertical sync valid and horizontal sync valid signals VSV and HSV, and whether valid data are present as signaled by VSD on line 148, circuit 118 creates an address where the valid video input data must be stored in the frame buffer 168. This address is a function of where the current data fit into the low resolution frame being sent by the host computer video output port and also on the mode latched on bus 150 by control latch 160. Because of the specific frame buffer 168 organization to be discussed hereinafter, INSEL on line 202 is used to select the appropriate DRAM chips within frame buffer 168 based on the current input line being received. Input addresses generated by circuit 118 are sent to address multiplexer 116 on 16 bit INADDR bus 204.

Address generator 118 consist of integrated circuits U12 and U13 of FIG. 6. Circuits U12 and U13 are Monolithic Memories 2X10 PALs. Circuit U12 is configured according to CUPL source code of Appendix J and circuit U13 is configured according to CUPL source code of Appendix K.

Dual port RAMs 16 of FIG. 1 comprise address multiplexer 166, frame buffer 168, RAM arbiter 162 and timing generator 164. RAM arbiter circuit 162 resolves conflicts resulting from the need of data shifters and input address generator 10 to send video image data on RAM data bus 200 to frame buffer 168 as signalled by VSD on line 148 of FIG. 4, and the need of the video output shifters and output address generator 180 to have the serial ports of the DRAM's used in frame buffer 168 loaded with output data for output display as signalled by RQ line 206 by the output address generator 180. In order to load the shift registers in the video shift register DRAMS employed in frame buffer 168, the output display portion of video demultiplexer 5 must request that the data input portion of video demultiplexer 5 execute a shift register load cycle on the RAM port of the shift register DRAMS. Data shifters and input address generator 10 of FIG. 1 and video output shifters and output address generator 18 of FIG. 1 operate asynchronously. Synchronization is accomplished via two wire handshakes on the RQ and ACK lines 206 and 208 respectively. RQ is asserted when the output address generator 180 makes a request. ACK is asserted on line 208 when the RAM arbiter 162 acknowledges the request after servicing it. At the start of the shift register load cycle, when no transfer is requested and none has recently occurred, neither RQ nor ACK are asserted on lines 206 and 208. When the output section requires a shift register DRAM to be loaded, it places the address information on bits 8 to 15 of XADDR bus 210. Some of this information is the address to be loaded into the shift register DRAM, and the rest of the information is chip select information to access a specific DRAM. At this point the output address generator 180 asserts RQ on line 206. The information on XADDR line 210 must be maintained as valid while RQ is asserted on line 206. When arbiter 162 sees RQ line 206 go low, and as soon as it deems appropriate it executes the requested data transfer cycle and then asserts an ACK on line 208. When output address generator 180 sees ACK asserted on line 208 it assumes the data transfer has been performed and unasserts signal RQ on line 206. When arbiter 162 sees RQ on 206 unasserted, it unasserts ACK on line 208. This completes the DRAM load cycle. In the time period from when RQ is asserted on line 206 and ACK is unasserted on line 208, signals XADDR on line 210 and XSEL on line 212, to be discussed hereinafter, are guaranteed to be held stable by the output address generator 180 so that the input section can perform the data transfer operation synchronously with the output address generator 180 even though both sections of the video demultiplexer are run from separate clocks. RAM arbiter 162 also observes VSD on line 148 as well as RQ to determine on a cycle by cycle basis which of three types of cycles should be run on the RAM port of frame buffer 168. These cycles are, in order of priority, (1) writing input data to DRAMS as signaled by VSD, which indicates when input shifter 106 is full of data which needs to be written, (2) data transfer for the output section, discussed hereinabove and (3) a refresh cycle. RAM arbiter 162 asserts XFER on line 214 to indicate to timing generator 164 and address multiplexer 166 that a transfer is being performed, and asserts a write signal on line 216 to indicate to timing generator 164 that a write is in progress. A WRITE signal on line 216 is asserted when VSD is true. When VSD is not true and RQ is asserted on line 206, arbiter 162 uses the current cycle for a data transfer operation by asserting XFER on line 214. If neither VSD nor RQ are asserted, then arbiter 162 causes a refresh cycle to be run by not asserting XFER on line 214 or WRITE on 216. WRITE and XFER are mutually exclusive.

RAM arbiter 162 consists of portions of integrated circuit U7 of FIG. 6 described hereinabove.

Address multiplexer 166 generates DRAM addresses for use by frame buffer 168. Address multiplexer 166 selects either a 16 bit input address INADDR from bus 204, generated by address generator 118, or an 8 bit output address, XADDR on bus 210, generated by output address generator 180, based on the status of the XFER signal on line 214 from RAM arbiter 162. Circuit 166 selects either the high order or low order 8 bits of XADDR or INADDR based on the row address strobe (RAS) on line 218 and the column address strobe (CAS) on line 220 which are responsive to the phases of the 4 phase clock from input synchronizer 104 on lines C30–C33. XADDR contains only 8 bits because as a result of the layout of display memory in the DRAMS, only the higher order 8 bits of a 16 bit word are necessary. The value of the low order 8 bits would always be zero. Multiplexer 166 takes this into account and forces the RAM address output on line 226 to be 0 when an otherwise existing low order XADDR would be appropriate.

Figure 9:
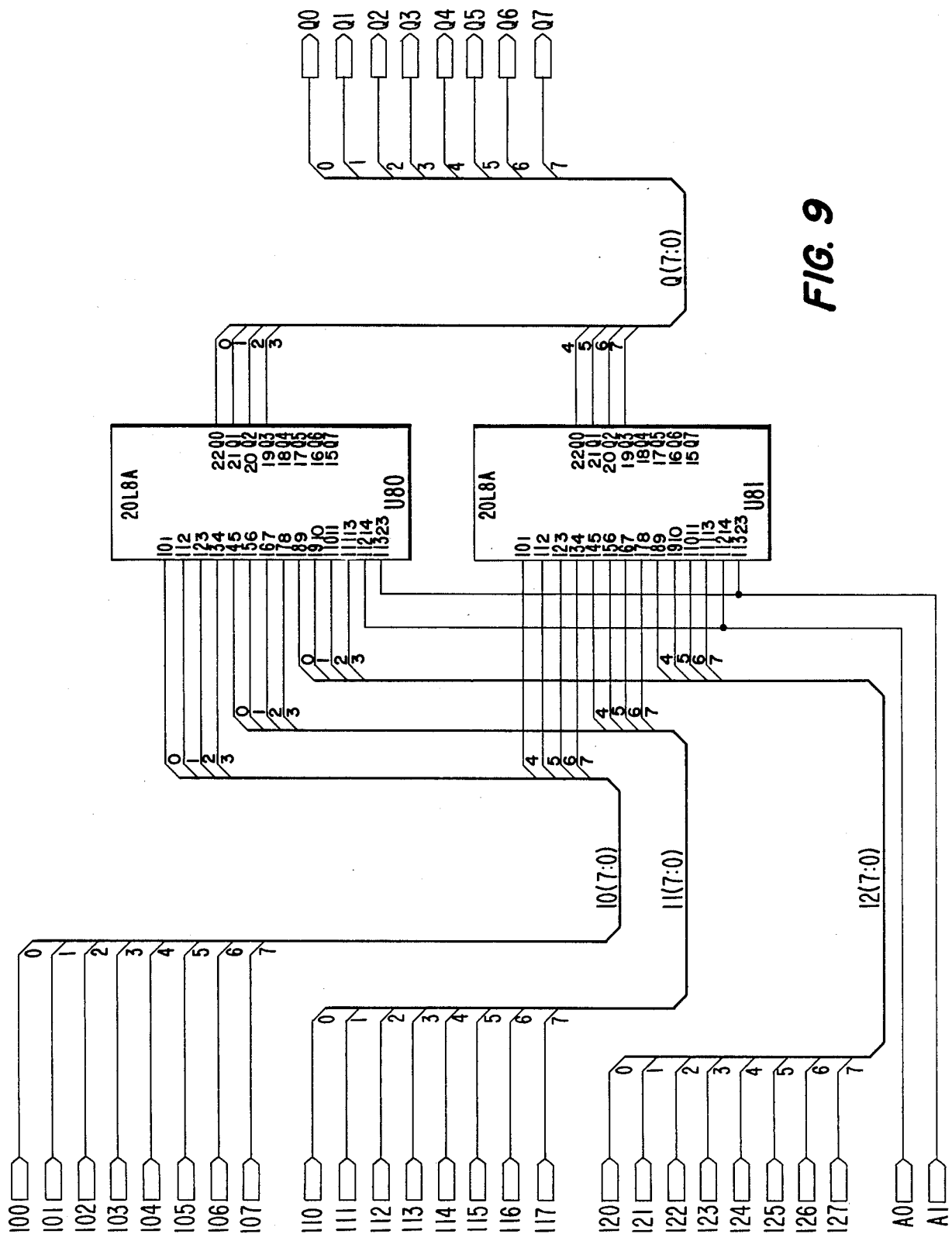
FIG. 9 is an electrical schematic diagram showing the individual integrated circuits of the address multiplexer 166 of FIG. 7.

Address multiplexer 166 consists of integrated circuits U80 and U81 of FIG. 9. Circuits U80 and U81 are both Monolithic Memories 20L8A PALS, both configured according to the CUPL source code of Appendix N.

Timing generator 164 creates all of the basic DRAM signals with their associated timing. This generator 164 accept commands from the RAM arbiter 262 via the WRITE signal on line 216, and the XFER signal on line 214. These commands define which of three cycles the generator is to cause the Drams in Frame Buffer 168 to execute during the current cycle of the 3.58 MHz clock C33. These three cycles are a write of incoming video data, a data transfer operation, or a refresh cycle. The timing generator 164 blends the command information, with the below mentioned timing information, and below mentioned chip select information to create all of the DRAM signals which on the Dram Control buss (X).

If WRITE is asserted on line 216, then the Timing Generator 164 causes the Drams in Frame Buffer 168 to execute a write cycle. In this case WE on line 224 is unasserted, and DTOE on line 222 is unasserted. Further, during a write cycle, the Timing Generator 164 uses the INSEL line 202 to create chip select information via the RAS lines 218, and uses signals on the MODE buss 150 to create chip select information via the CAS lines 220.

If XFER is asserted on line 215, then the Timing Generator causes the Drams in Frame Buffer 168 to execute a data transfer cycle. In this case WE on line 224 is unasserted, and DTOE on line 222 is asserted, and both CAS signals on buss 220 are asserted. Further, during a data transfer cycle, the Timing Generator 164 uses the XSEL signals on buss 212 to create chip select information via the RAS lines 218.

If WRITE on line 216 is unasserted, and XFER on line 215 is unasserted, then the TIMING GENERATOR 164 causes the DRAMS in FRAME BUFFER 168 to execute a refresh cycle. In this case WE on line 224 and DTOE on line 222 are both deasserted, and a CAS before RAS refresh is implemented via the RAS lines in buss 218, and the CAS lines in buss 220.

The DRAMS used to implement the FRAME BUFFER 168 require a timing resolution finer than that provided by the 3.58 MHz clock provided by C33. See the manufacturer's specification for the DRAMs used for more information on DRAM timing. In addition to the aforementioned chip select information created by TIMING GENERATOR 164 via the RAS lines on buss 218 and the CAS lines on buss 220, and in addition to the control information created by the TIMING GENERATOR 164 via the WE line 224 and the DTOE line 222, explicit timing information required by the DRAMS used to implement the FRAME BUFFER 168 must exist on the RAS lines 218, the CAS lines 220, the WE line 224, and the DTOE line 222. This timing information is derived by the TIMING GENERATOR 164 from the four phase clock inputs C30, C31, C32, and C33.

Timing generator 164 consist of integrated circuit U18 of FIG. 6. Circuit U18 is a Monolithic Memories 20L8A PAL configured according to the CUPL source code of Appendix M. Frame buffer 168 consists of 8 DRAMS organized as 2 across by 4 down and stores video input data asserted on line 200 at addresses indicated on line 226 from address multiplexer 166. RAS and CAS timing signals are asserted on lines 218 and 220 respectively and timing generator 164 provides a write enable signal WE on line 224, and a data transfer signal to all DRAMS, DTOE on line 222. Clock distributor 178, to be discussed hereinafter, provides 4 bit output enable signal SOE on bus 228 to each DRAM row and 4 bit shift clock signal SC on bus 230 to each DRAM row. The RAM chips used as 64K×4 chips with 256×4 serial shift register ports. There are a total of 8 RAMS organized as two groups of 4. Each group is associated with one plane of display memory, and the 2 groups are essentially identical. Within one plane each line of output video exist entirely within 1 DRAM, and a single shift register load (256×4) will load an entire line of video output into the serial port of that RAM, thus when the display is scanning a single output line, all of those data come from a single DRAM. The input lines have been divided such that each successive lines of video information comes from a different DRAM. Thus, a shift register load can occur up to 3 line times before those data are needed. This large degree of latency compensates for the fact that the output display section runs asynchronously to the input data section, therefore the RAM port may be tied up for long periods of time (up to 50 us) accepting write data from the input video section thus preventing shift register loads from occurring during this interval. The output display line time is about 16 us which means that during the horizontal blanking time of the input video frame, several shift register loads must take place in order to maintain the outer video display. Video output lines are stored in drams as follows:

|  | PLANE 0 | | | |
| --- | --- | --- | --- | --- |
|  | DRAM 0 | DRAM 1 | DRAM 2 | DRAM 3 |
| Line Display | 0 | 1 | 2 | 3 |
|  | 4 | 5 | 6 | 7 |
|  | 3 | 9 | 10 | 11 |
|  | . | . | . | . |

|  | PLANE 1 | | | |
| --- | --- | --- | --- | --- |
|  | DRAM 0 | DRAM 1 | DRAM 2 | DRAM 3 |
| Line Display | 0 | 1 | 2 | 3 |
|  | 4 | 5 | 6 | 7 |
|  | 3 | 9 | 10 | 11 |
|  | . | . | . | . | and so forth. Thus the input circuitry generates addresses which conform to this layout, and the output circuitry needs only to specify which line within which DRAM to load, as the loading offset within any DRAM is always zero because the data are properly aligned in the DRAM. Two CAS signals are used to select either plane zero or plane one. Four RAS signals are used to select a given DRAM within either plane. This combination allows the DRAMs to be individually accessed. All DRAMS share common WE signals on line 224 and DTOE signals on line 222.

Figure 10A:
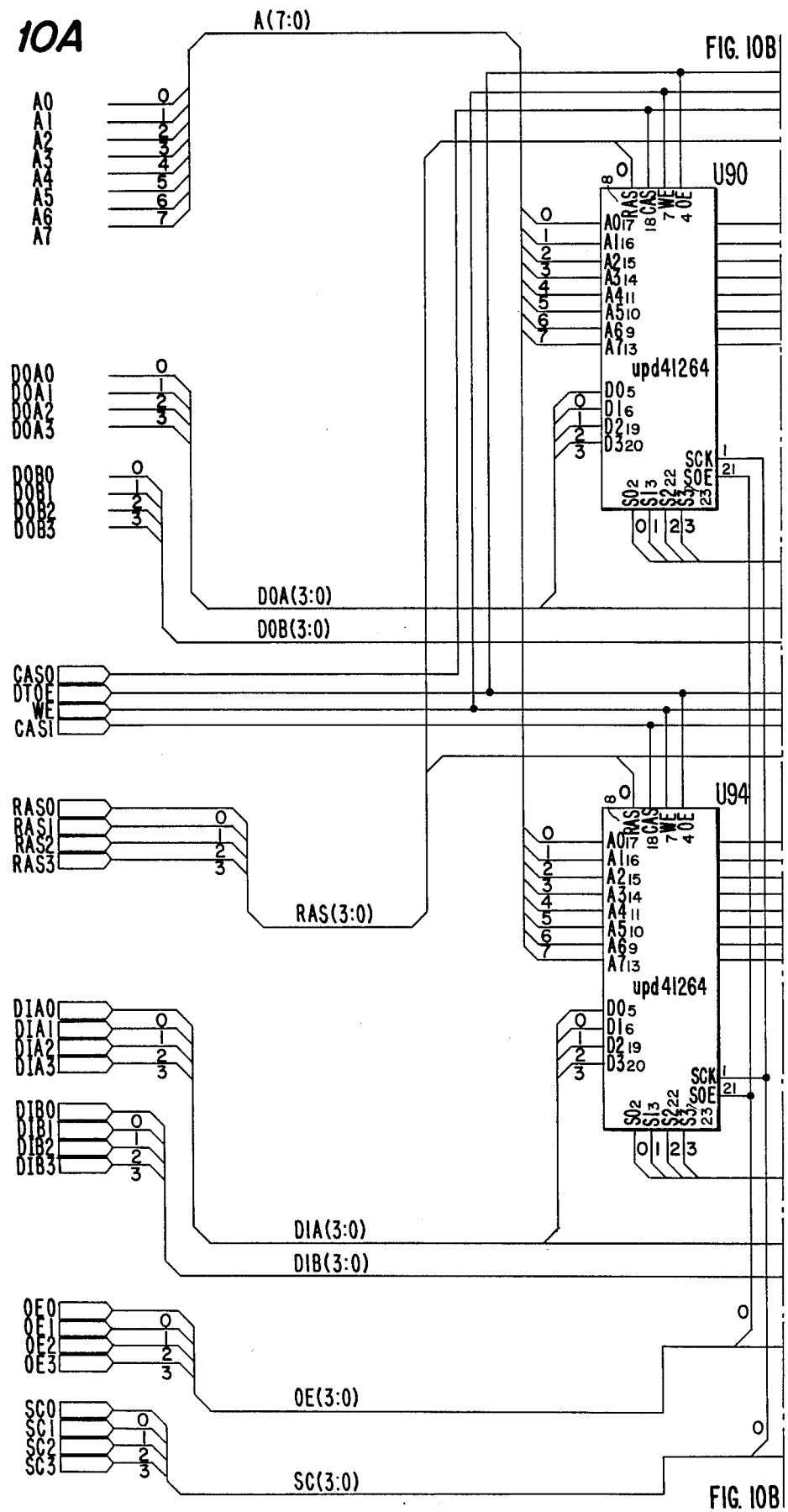
FIG. 10 is an electrical schematic diagram showing the individual integrated circuits of the video RAMs 440 of FIG. 8.
Figure 10B:
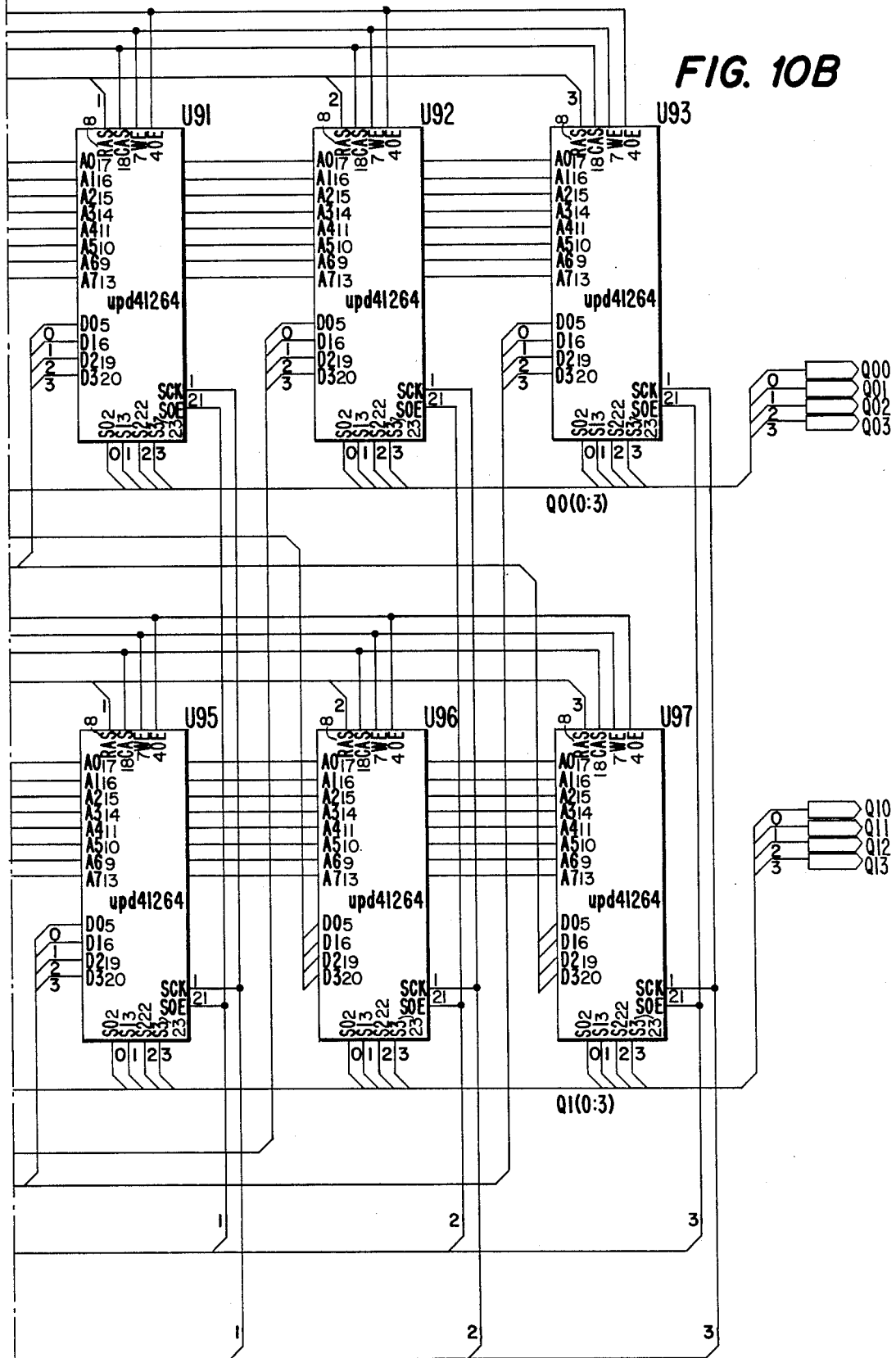

Frame buffer 168 consist of the integrated circuits U90–U97 of FIG. 10. Circuits U90–U97 are all NEC 64K dual port dynamic NMOS RAMs, part number UPD41264-12.

Video output shifters and output address generator 18 of FIG. 1 comprise 72 MHz clock 172, 49.5 MHz clock 176, clock select circuit 174, output shifter and processor 170, output address generator 180, and output timing circuit 182.

Clock selector 174 receives 72 MHz clock signals from clock 172 or 49.5 MHz signals from clock 176, and mode signals on mode bus 150. The preferred embodiment supports multiple horizontal resolutions, therefore two pixel clocks are necessary; clock 176 for nominally 704 pixels per line and clock 172 for nominally 1024 pixels per line. Clock select circuit 174 selects which of the two clocks to use for pixel clock signals based on mode information from the control block in response to the EXPAND mode bit of Table 1. Output on line 232 is either a 72 MHz or 49.5 MHz clock signal.

Clock selector 174 consists of integrated circuit U16 of FIG. 6. Circuit U16 is a QUAD 2 input NAND gate, standard part number 74F00.

Output shifter and processor circuit 170 performs three distinct tasks. First, 4 bit video output data from frame buffer 168 on bus 238 for video frame plane zero, or bus 240 for video frame plane 1, are loaded into video output data shift registers and are shifted out to a high resolution video output display on line 234 and 236. Next, circuit 170 modifies video being shifted out on lines 234 and 236 based on blanking input on line 242 from output timing circuit 182, to be discussed hereinafter, and mode signals on bus 150. Finally, output shifter and processor 170 creates a PIX4 clock signal on line 244 for controlling the output timing circuit 182 and clock distributor circuit 178 to be discussed hereinafter. PIX4 is the pixel clock signal PCLK on line 232 divided by 4.

Figure 11:
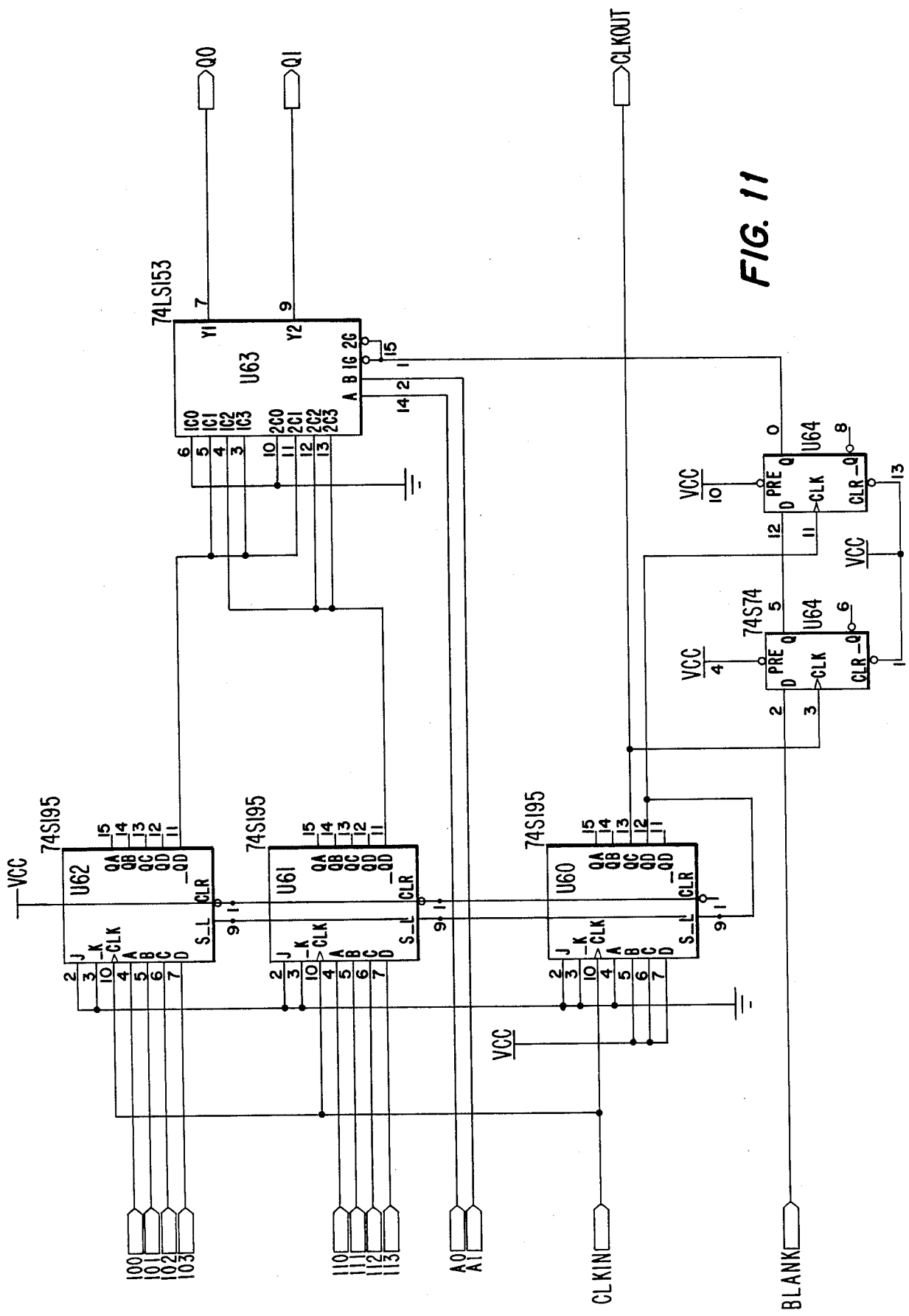
FIG. 11 is an electrical schematic diagram showing the individual integrated circuits of output shifter 460 of FIG. 8.

Output shifter and processor circuit 170 consists of integrated circuits U60-U64 of FIG. 11. Circuits U60-U62 are 4 bit parallel load serial out shift registers, standard part number 74F195. Circuit U63 is a dual 4 input multiplexer standard part number 74F153. Circuits U64 are D-type flip-flops, standard part number 74F74.

Output address generator 180 creates the 8 bit address, XADDR on bus 210, to be used for shift register DRAM load operations for removing video output data from frame buffer 168. Address generator 180 sends RQ signals on line 206 to RAM arbiter 162 and receives acknowledge ACK signals on line 208 in the manner discussed hereinbefore, and also creates a two bit chip select, XSEL on bus 212 to identify the shift register to perform the shift register load operation in frame buffer 168.

Output address generator 180 consists of integrated circuits U8 of FIG. 5 and U9 of FIG. 6. Circuit U8 is a Monolithic Memories 20X8 PAL configured according to the CUPL source code of Appendix G. Circuit U9 is a Monolithic Memories 20X10 PAL configured according to the CUPL source code of Appendix H.

Clock distributor 178 receives a 2 bit OUTSEL signal on bus 246 from output timing circuit 182 which indicates the output line currently being displayed. Circuit 178 then applies 4 bit signal OE on bus 228 to enable one output line's DRAMs. One of the four OE signals on line 228 is valid continuously and is selected by OUTSEL. Only one line's DRAMs are clocked for serial output data at any time. These are the same DRAMs whose outputs are enabled, thus the selection is also indicated by OUTSEL on bus 246.

Clock distributor 178 consists of integrated circuits U14 of FIG. 6, both of which are dual 2 to 4 line decoders, standard part number 74F139.

Output timing circuit 182 generates the horizontal output video syn signal HSYNC/OUT on line 248, vertical output video sync VSYNC/OUT on line 250, output video blanking signal BLANK on line 252, and 2 OUTSEL bits on bus 246. Circuit 182 is clocked by the PIX4 clock signal on line 244 from output shifter and processor 170. The same clock times the serial data out of the serial port on the dual ported RAM of frame buffer 168. Output timing circuit 182 counts nybbles in an output display line and generates the HSYNC/OUT signal on line 248 and the BLANK signal on line 252. OUTSEL on bus 246 is used by clock distributor 178 to route the nybble clock to, and enable the output of, the appropriate DRAMs for displaying the current video output line. Circuit 182 and 180 count the lines being displayed to generate VSYNC/OUT on line 250 and modify the BLANK on line 252 as appropriate.

Output timing circuit 182 consists of parts of integrated circuits U9-U11 of FIG. 6. Circuit U9 has been discussed hereinabove as part of the output address generator 180. Circuit U10 is a Monolithic Memories 20X10 PAL configured according to the CUPL source code of Appendix I. Circuit U11 is a 4 bit up/down synchronous counter (binary), standard part number 74F169A.

No power connections are shown on the integrated circuit wiring diagrams of FIGS. 6-14 to avoid cluttering the drawings. The integrated circuits shown are all connected to Vcc and ground in the standard manner.

It will be apparent to those skilled in the art that various modifications and variations can be made in the automated assembly system of the present invention without departing from the spirit of scope of the invention. Thus, it is intended that the present invention cover the modifications and variations of this invention provided they come within the scope of the appended claims and their equivalents.

What is claimed is:

1. A system for generating high horizontal resolution video output frames having a plurality of horizontal lines from low resolution video input frames having a plurality of horizontal lines, comprising:
   means for receiving video input data representing a plurality of low resolution video input frames;
   means for storing said plurality of low resolution video input frames at a first clock rate;
   means for combining corresponding lines of selected ones of said plurality of stored frames to form a single horizontal line; and
   means for outputting each said formed single horizontal line at a second clock rate substantially greater than said first clock rate thereby generating a horizontal line output having a higher resolution than the horizontal lines of said low resolution input frames.

2. A method of generating high resolution video output frames having horizontal lines from lower resolution video input frame shaving horizontal lines, comprising:
   receiving video input data representing a plurality of low resolution video input frames;
   storing a plurality of said lower resolution video input frames at a first clock rate;
   combining corresponding lines of selected ones of said plurality of stored frames to form a single horizontal line of video data;
   outputting each of said formed single horizontal lines at a second clock rate substantially greater than said first clock rate thereby producing high resolution video output frames from said formed horizontal lines having a substantially higher resolution than the horizontal lines of said low resolution input frames; and
   displaying a single frame of video data from a plurality of said formed single horizontal lines.

3. A method of converting low resolution computer video output data signals to high resolution video output data signals representing high resolution video frames, comprising:
   generating a plural phase input clock signal;
   generating a horizontal and vertical synchronous valid signal in response to the low resolution computer video output data signals representing a plurality of low resolution video frame having a plurality of horizontal lines, each of said lines comprising a first number of pixels;
   storing the data from a plurality of low resolution video frames in a pre-selected arrangement in a frame buffer at a rate corresponding to the plural phase clock signal;

combining similar horizontal lines of low resolution video data corresponding to selected ones of said plurality of stored frames to form a single horizontal line of video data having a second number of pixels equal to the sum of the first number of pixels from each of said combined lines; and reading out each of said formed single horizontal lines at a rate greater than said input clock rate thereby producing high resolution video output data signals having a substantially higher resolution than said ow resolution video input signals.

4. A system for generating a high resolution computer video display from a low resolution video computer output, comprising:

input means including first clock means for generating a plural phase clock signal and means for generating horizontal and vertical synchronous valid signals in response to horizontal and vertical synchronous signals from a plurality of low resolution computer video output frames, each of said frames having a plurality of horizontal lines comprising control data and video image data;

beam counter means operatively coupled to said input means for detecting the scan position for each of said lines of control data and video image data from said input means;

input address generating means responsive to said horizontal and vertical valid signals for generating storage addresses for said lines of video image data;

buffer means governed by said generated storage addresses, for storing each of said lines of video image data in a selected arrangement, each of said lines of video image data having a first number of pixels corresponding to each of said plurality of low resolution frames;

transfer means for transferring said lines of video image data to said frame buffer means;

output means address generating means for determining the sequence of read-out of said lines of video image data from said buffer means;

means for multiplexing said generated input addresses and said generated output addresses;

second clock means for generating output clock signals having a greater repetition rate than said plural phase clock signal from said first clock means; and output means including timing means, responsive to said output clock signals, for generating output video signals for each line of a single high resolution video display frame having a resolution approximately equal to the total of said first number of pixels in each of a plurality of corresponding lines of selected ones of the plurality of low resolution frames.

5. A system according to claim 1, further including means for interleaving the horizontal lines of selected ones of said plurality of frames for increasing the vertical resolution of said high horizontal resolution video output frame.

6. A system according to claim 5 wherein said plurality of frames is four.

7. A method according to claim 2, further comprising interleaving horizontal lines of the plurality of frames to increase the vertical resolution of said high resolution video output frames.

8. A method according to claim 7, wherein said plurality of frames is four.

* * * * *

UNITED STATES PATENT AND TRADEMARK OFFICE
CERTIFICATE OF CORRECTION

PATENT NO. : 4,851,826

DATED : July 25, 1989

INVENTOR(S) : Hedley C. DAVIS

It is certified that error appears in the above-identified patent and that said Letters Patent is hereby corrected as shown below:

IN THE CLAIMS:

Claim 2, column 16, line 36, change "frame shaving" to --frames having--; and

Claim 2, column 16, line 40, change "lower" to --low--.

Claim 3, column 17, line 11, change "ow" to --low--.

Signed and Sealed this

Seventeenth Day of July, 1990

Attest:

HARRY F. MANBECK, JR.

Attesting Officer     Commissioner of Patents and Trademarks